United States Patent Office 3,410,159
Patented Nov. 12, 1968

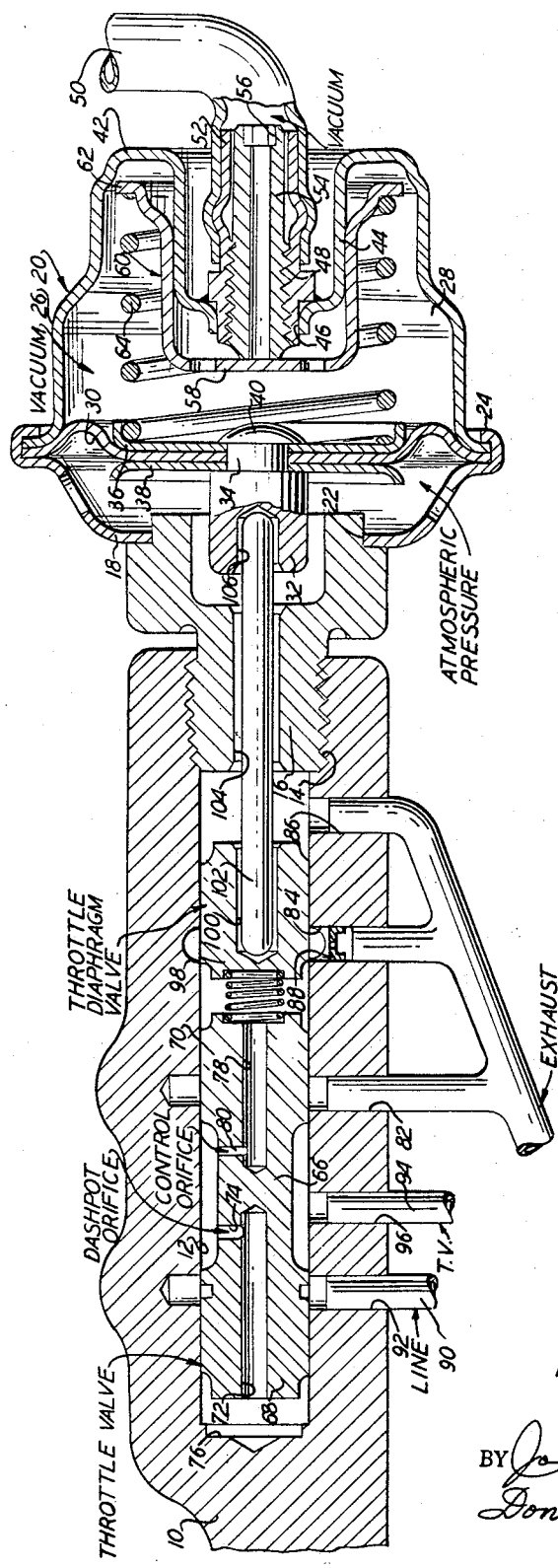

3,410,159
ENGINE MANIFOLD PRESSURE OPERATED
THROTTLE VALVE SYSTEM
Robert P. Zundel, Birmingham, Mich., assignor to Ford
Motor Company, Dearborn, Mich., a corporation of
Delaware
Continuation-in-part of application Ser. No. 598,113,
Nov. 30, 1966. This application Feb. 5, 1968, Ser.
No. 710,422
3 Claims. (Cl. 74—863)

ABSTRACT OF THE DISCLOSURE

This specification describes a pressure modulator valve having a substantially rateless characteristic. It is adapted for use with automatic power transmission mechanisms in automotive vehicle drivelines that include also an internal combustion engine. The actuating forces acting on the valve are determined by the pressure drop across a flow control orifice, which in turn is dependent upon engine manifold pressure.

References to related applications

This specification is a continuation in part of applicant's co-pending application Ser. No. 598,113, now abandoned, filed Nov. 30, 1966. That application was a continuation of earlier application Ser. No. 397,786, now abandoned, filed Sept. 21, 1964.

General description of the invention

My invention relates generally to pressure modulator valves capable of producing a pressure signal in an automatic control valve system, and more particularly to a throttle valve system for a control valve circuit in an automotive power transmission mechanism. I contemplate that my improved valve system can be used with an automatic, multiple ratio, power transmission mechanism in an automotive vehicle driveline that includes also an internal combustion vehicle engine having a throttle controlled air-fuel mixture intake manifold. My valve system responds to changes in engine manifold pressure to produce a resultant pressure signal that may be utilized by valve components of the circuit to initiate speed ratio changes in the transmission mechanism.

I am aware of various control circuits for automatic power transmission mechanisms that employ a pressure signal that is sensitive to the manifold pressure of an internal combustion engine. One such system is shown in U.S. Patent No. 3,095,755, which is assigned to the assignee of my instant invention. Such a system is shown also in my commonly owned co-pending U.S. Patent No. 3,274,848. These disclosures show a throttle valve mechanism that is used for establishing a pressure signal for automatic shift valves that function to distribute selectively control pressure to various clutch and brake servos to initiate speed ratio changes. The throttle valve mechanism comprises a pressure modulator valve element that is in fluid communication with a control pressure source. The valve element regulates the control pressure to produce a resultant pressure that is proportional in magnitude to engine manifold pressure.

The valve actuator servo for the throttle valve mechanism includes a housing that cooperates with a flexible diaphragm to define a vacuum chamber. A manifold pressure passage interconnects the engine manifold with this chamber so that the diaphragm will yield as the manifold pressure changes. A compression spring is situated between the diaphragm and a stationary reaction portion of the chamber, and a mechanical connection is provided between the outer side of the diaphragm and the throttle valve element. Thus as the manifold pressure increases during operation, the spring will urge the diaphragm and the throttle valve element toward a position that corresponds to a maximum throttle valve pressure signal. Conversely, as the engine manifold pressure decreases, the spring is compressed as the diaphragm is backed off. This, of course, results in a reduction in the magnitude of the throttle valve pressure signal.

It has been found in practice that throttle valve systems of this type are characterized by a so-called hysteresis effect at the high and low pressure signal extremes. For example, the maximum pressure signal made available when the engine operates at its maximum manifold pressure is less than an optimum, maximum, calculated value since the spring rate of the spring results in a lower effective spring force when the diaphragm yields to a position corresponding to the maximum throttle valve pressure position for the throttle valve element. Conversely, the minimum pressure signal that may be obtained is greater than the minimum calculated value corresponding to a minimum engine manifold pressure. This is due to the fact that the spring rate of the diaphragm spring increases the effective spring force as the diaphragm yields to a position that corresponds to the minimum pressure signal position for the throttle valve element.

The deviations from the optimum calibrated values for the throttle pressure signal at any given pressure makes it more difficult to precisely control the shift quality in an automatic power transmission mechanism. This is due to the fact that the shift valves of the automatic control valve circuit are sensitive to the pressure signal produced by the throttle valve and it is due also to the fact that the throttle valve pressure signal affects, either remotely or directly, the magnitude of the regulated control pressure in the circuit.

It is an object of my invention to provide a throttle valve system in which the disadvantages of the hysteresis effect associated with throttle valve systems of known design is eliminated.

It is a further object of my invention to provide a throttle valve system for an automatic power transmission mechanism which includes an engine vacuum sensitive diaphragm capable of distributing a control force to a movable throttle valve element of the system without a corresponding displacement as the force is caused to vary.

It is a further object of my invention to provide a modulator valve element in a control valve circuit which includes a rateless movable valve element that responds to valve operating forces, the latter being independent of displacement of the valve element.

It is another object of my invention to provide a rateless valve system of the type above set forth wherein provision is made for eliminating uncontrolled oscillations of the movable portions of the valve system during operation.

Particular description of the invention

For the purpose of describing the improvements of my invention more particularly, reference will be made to the accompanying drawing which shows in longitudinal cross-sectional form my improved throttle valve assembly. Reference may be had to the two disclosures identified above for the purpose of supplementing this disclosure.

In the drawing numeral 10 designates a portion of a cast valve body which may be formed of aluminum alloy or any other suitable material. A valve bore in the form of a cylindrical opening is shown at 12. The open end of the bore 12 is threaded as shown at 14 to receive an externally threaded adaptor 16. This adaptor carries a housing portion 18 of a manifold pressure operated servo 20. The housing portion 18 is formed with a central opening 22 through which is received an extension of the adaptor 16. The connection between the adaptor 16 and the housing portion 18 can be effected by either a force fit or by staking the extension to the margin of the opening 22.

The outer periphery of the housing portion 18 is formed with a lip 24 that overlaps an adjacent outer periphery of a companion housing portion 26 for the servo 20. This portion 26 is formed with a circular cross section and it defines in part a vacuum cavity 28. One end of this cavity is covered by a flexible diaphragm 30, the outer margin of which is secured to the outer margins of the housing portions 18 and 26 by the lip 24.

A stem 32 is carried by the diaphragm 30 at its center. It includes a reduced diameter portion 34 that is received through a central opening formed in the diaphragm.

The diaphragm 30 forms a part of an assembly that includes also diaphragm back-up plates 36 and 38 having central openings that receive the reduced diameter portion 28. They are held against a shoulder formed on the stem 32 by a crowned head 40.

The closed end of the housing portion 26 defines a wall 42 having a central re-entrant portion 44. This re-entrant portion is formed with an opening 46 that receives an adaptor sleeve 48. The sleeve 48 can be held securely within the opening 46 by the wall 42 as indicated. The end of a flexible hose 50 is received over the sleeve 48. It extends to the intake manifold of an air-fuel mixture manifold controlled internal combustion engine.

An adjusting member 52 is threadably received within the sleeve 48, the latter being internally threaded for this purpose. The adjusting member 52 is formed with a central passage 54 that provides communication between the hose 50 and the cavity 28. A suitable socket 56 can be formed in the outer end of the adjusting member 52 to accommodate a suitable hand wrench. By turning the adjuster member 52, the calibration of the servo can be changed as desired.

One end of the adjusting member 52 engages a central portion 58 of a spring seat member 60. This member, which is substantially cylindrical in form, is received telescopically over the re-entrant portion 44 of the housing portion 26. The margin 62 of the spring seat member is engaged by one end of the compression spring 64. The other end of spring 64 engages the diaphragm plate 36. The pre-load of the spring 64 can be changed by appropriately adjusting the member 52. It is necessary, of course, to remove the hose 50 before the adjustment is made.

Portion 58 of the spring seat member is apertured to permit free communication between passage 54 and the cavity 28.

The bore 12 receives a valve spool 66 having spaced valve lands 68 and 70. The annular space situated between the lands 68 and 70 is in fluid communication with the left-hand extremity of the bore 12 through a central passage 72 and a communicating radial passage 74. This left-hand end of the bore 12, which is identified by reference character 76, can be termed a dashpot chamber. The passage 74 functions as a dashpot orifice.

The portion of the bore 12 on the right-hand side of the valve element 66 is in fluid communication with the annular space between lands 68 and 70 through a central passage 78 and a communicating radial control orifice 80.

Exhaust ports communicating with the bore 12 are formed in the body 10 as indicated at 82, 84 and 86. Each exhaust port communicates with a common exhaust region that is under atmospheric pressure. Port 84 includes, however, a flow restricting orifice 88 for reasons that will be explained subsequently.

A line pressure supply passage 90 communicates with a line pressure port 92. A throttle valve pressure signal passage 94 communicates with throttle valve pressure port 96.

A throttle diaphragm valve, which may be in the form of a single diameter plunger, is shown at 98. A light valve spring is situated between the throttle diaphragm valve 98 and the throttle valve spool 66 to urge them apart. It includes an opening 100 which receives a valve operating rod 102. This rod is received within a central opening 104 formed in adaptor 16. The other end of the rod 102 is received within an opening 106 of the stem 32.

During operation of this valve system in the environment of an engine manifold vacuum controlled valve circuit for an automatic power transmission mechanism, the throttle diaphragm valve is statically balanced by the diaphragm force and by opposing throttle pressure force. Similarly, the pressure forces acting upon the valve element 66 are statically balanced.

When the engine is inoperative, the pressure in cavity 28 is equal to atmospheric pressure. Thus, the spring 64 will urge the throttle diaphragm valve 98 in a left-hand direction thereby covering exhaust port 84. When the engine is started, the pressure in cavity 28 falls to a value equal to engine manifold pressure. A control pressure source in the form of an engine driven pump delivers control pressure to passage 90. This control pressure will tend to be received within the annular space between the lands 68 and 70, and it will be distributed therefore to the dashpot chamber 76 and to the portion of the bore 12 on the right-hand side of valve element 66. The pressure in the annular space between lands 68 and 70 is distributed to passage 94 and is utilized as throttle valve signal pressure. This throttle valve pressure, of course, acts upon the left-hand side of the throttle diaphragm valve thereby tending to urge the latter in a right-hand direction until it begins to uncover exhaust port 84. This throttle pressure force acting on the throttle diaphragm valve and the opposing resultant force of the spring 64 and the manifold pressure sets the throttle diaphragm valve in static balance.

As port 84 begins to be uncovered, the pressure acting on the right-hand side of valve element 66 tends to become reduced. Since it is required that the valve element 66 be balanced, the reduced pressure then is distributed through the dashpot orifice to the dashpot chamber 76. As the valve element 66 tends to shift, the degree of communication between line pressure supply passage 90 and throttle valve passage 94 increases and the degree of communication between exhaust port 82 and throttle valve pressure passage 94 decreases.

It is apparent, therefore, that the flow of fluid through the port 84 is controlled by the throttle diaphragm valve which in turn is sensitive to manifold pressure. Upon an increase in manifold pressure the rate of flow is decreased. Conversely, the flow is increased as the manifold pressure decreases. As the flow through the port 84 is changed, the pressure drop across the control orifice 80 is changed accordingly. This pressure drop, as explained previously, tends to change the pressure in the dashpot chamber 76 so that a static balance is maintained at all times for the valve element 66. A negligible amount of valve movement is required which means, of course, that a negligible amount of diaphragm movement is required. Thus, the force of the spring 64 influences the calibration of the valve system and it remains substantially constant as the regulated pressure in passage 94 changes from one extreme value to another. The hysteresis effect described in the preceding part of this specification thus is eliminated.

As the throttle diaphragm valve controls the degree of communication between the exhaust port 84 and the interior of the bore 12, it is possible that uncontrolled oscillations of the valve may take place. If this oscillation were to occur, this would of course result in corresponding oscillations in the magnitude of the regulator pressure made available to the throttle pressure signal passage 94. I have overcome this problem by introducing the orifice 88 into the exhaust port 84. Thus, the flow through the port 84 that is allowed by the throttle diaphragm valve 88 during operation of the valve system will produce a back pressure on the upstream side of the orifice 88. This back pressure then creates a side loading upon the valve 98 which tends to have a dampening effect. As flow is increased, the back pressure is increased and hence the side loading is increased. Thus, any tendency for the valve element to increase its displacement would be accompanied by a corresponding increase in the side loading. I thus have achieved an inherent stabilizing influence which prevents the building up of oscillatory forces.

Having thus described a preferred embodiment of my invention, what I claim and desire to secure by U.S. Letters Patent is:

1. In a throttle valve system for an automatic control valve circuit in an automatic power transmission driveline that includes an internal combustion engine with a throttle controlled air-fuel mixture intake manifold, modulator valve means in communication with a line pressure supply port for modulating said supply pressure to produce a resultant throttle valve pressure, a fluid flow passage extending from a region of said modulator valve means that is subjected to throttle valve pressure to a low pressure region of said circuit, said flow passage including a flow restricting orifice, means for subjecting said throttle pressure modulator valve means to the pressure differential across said orifice, manifold pressure responsive valve means for varying the rate of flow of fluid through said flow passage in response to variations in the magnitude of said manifold pressure, and spring means for urging said modulator valve means against the opposing forces of said pressure differential.

2. In a throttle valve system for use in a control circuit for a power transmission mechanism situated in a driveline that includes a throttle controlled air-fuel mixture intake manifold, a valve chamber, a throttle valve element situated in said chamber, a pair of valve lands on said valve element, a throttle pressure passage communicating with said valve chamber at a location intermediate said valve lands, a line pressure supply port and an exhaust port communicating with said valve chamber, one land being adapted to register with said line pressure port and the other land being adapted to register with said exhaust port, a dashpot chamber on one side of said valve element defined by said valve chamber and said valve element, passage means for distributing pressure from said throttle pressure passage to said dashpot chamber, a fluid flow passage including a flow restricting orifice extending from said throttle pressure passage to the other side of said valve element, manifold pressure responsive throttle diaphragm valve means including a diaphragm valve element for controlling the rate of flow of fluid through said flow passage whereby the valve actuating forces acting upon said throttle valve element are sensitive to changes in said manifold pressure, first spring means disposed between said valve element and said diaphragm valve means, said manifold pressure responsive valve means including also a manifold pressure operated servo comprising a housing, a movable diaphragm secured to said housing and cooperating therewith to define a vacuum cavity, means for subjecting said vacuum cavity to manifold pressure, a mechanical connection between said diaphragm and said diaphragm valve element, and second spring means acting upon said diaphragm for urging said diaphragm valve element to a flow passage restricting position, said spring means augmenting the pressure force acting upon said diaphragm.

3. In a throttle valve system for an automatic control valve circuit in an automatic power transmission driveline that includes an internal combustion engine with a throttle controlled air-fuel mixture intake manifold, modulator valve means in communication with a line pressure supply port for modulating said supply pressure to produce a resultant throttle valve pressure, a fluid flow passage extending from a region of said modulator valve means that is subjected to throttle valve pressure to a low pressure region of said circuit, said flow passage including a flow restricting orifice, means for subjecting opposed areas of said throttle pressure modulator valve means to the pressure differential across said orifice, spring means for urging said modulator valve means against the force of said pressure differential, manifold pressure responsive valve means including a diaphragm valve element for varying the rate of flow of fluid through said flow passage in response to variations in the magnitude of said manifold pressure, said manifold pressure responsive valve means including also a manifold pressure operated servo comprising a housing, a movable diaphragm secured to said housing and cooperating therewith to define a vacuum cavity, first spring means disposed between said valve element and said diaphragm for normally separating them, means for subjecting said vacuum cavity to manifold pressure, a mechanical connection between said diaphragm and said diaphragm valve element, second spring means acting upon said diaphragm for urging said diaphragm valve element to a flow passage restricting position, said spring means augmenting the pressure force acting upon said diaphragm.

References Cited
UNITED STATES PATENTS

| | | | |
|---|---|---|---|
| 3,025,877 | 3/1962 | Buckay | 137—620 |
| 3,033,335 | 5/1962 | Hause | 192—3.2 |

ARTHUR T. McKEON, *Primary Examiner.*